United States Patent
Lin et al.

(10) Patent No.: US 10,644,324 B2
(45) Date of Patent: May 5, 2020

(54) ELECTRODE MATERIAL AND ENERGY STORAGE APPARATUS

(71) Applicants: Kechuang Lin, Xiamen (CN); Yi-Jui Huang, Xiamen (CN)

(72) Inventors: Kechuang Lin, Xiamen (CN); Yi-Jui Huang, Xiamen (CN)

( * ) Notice: Subject to any disclaimer, the term of this patent is extended or adjusted under 35 U.S.C. 154(b) by 255 days.

(21) Appl. No.: 15/607,523

(22) Filed: May 28, 2017

(65) Prior Publication Data

US 2017/0263939 A1  Sep. 14, 2017

Related U.S. Application Data

(63) Continuation of application No. PCT/CN2015/076135, filed on Apr. 9, 2015.

(51) Int. Cl.
| | |
|---|---|
| H01M 4/86 | (2006.01) |
| H01M 4/131 | (2010.01) |
| H01G 11/24 | (2013.01) |
| H01G 11/46 | (2013.01) |
| H01M 4/136 | (2010.01) |
| H01M 4/137 | (2010.01) |

(Continued)

(52) U.S. Cl.
CPC .......... H01M 4/8605 (2013.01); H01G 11/24 (2013.01); H01G 11/28 (2013.01); H01G 11/46 (2013.01); H01G 11/50 (2013.01); H01M 4/131 (2013.01); H01M 4/136 (2013.01); H01M 4/137 (2013.01); H01M 4/661 (2013.01); H01M 4/808 (2013.01); H01M 10/052 (2013.01); H01M 10/0525 (2013.01); H01M 2004/021 (2013.01); Y02E 60/13 (2013.01); Y02T 10/7011 (2013.01); Y02T 10/7022 (2013.01)

(58) Field of Classification Search
CPC ........ H01G 11/04; H01G 11/06; H01G 11/24; H01G 11/26; H01G 11/30; H01G 11/32; H01G 11/36; H01G 11/46; H01G 11/70
See application file for complete search history.

(56) References Cited

U.S. PATENT DOCUMENTS

| | | | |
|---|---|---|---|
| 2010/0068623 A1* | 3/2010 | Braun | C25F 3/02 429/219 |
| 2012/0154983 A1* | 6/2012 | Zhang | H01G 11/36 361/502 |
| 2016/0240327 A1* | 8/2016 | Lin | H01G 11/46 |

FOREIGN PATENT DOCUMENTS

CN  104008889 A  *  8/2014

OTHER PUBLICATIONS

Zhang et al., Super-Long Life Supercapacitors Based on the Construction of Ni foam/graphene/Co3S4 Composite film hybrid electrodes, 2014, Electrochimica Acta, 132, pp. 180-185 (Year: 2014).*

* cited by examiner

Primary Examiner — Eric W Thomas
(74) Attorney, Agent, or Firm — Syncoda LLC; Feng Ma (57) ABSTRACT

An electrode material includes a fine-array porous material. The fine-array porous material includes a plurality of pores having a substantially uniform size of <1000 μm, with a variation of <20%, and comprises a metal such as Ni, Al, Ti, Sn and Mn. The metal fine-array porous electrode material can be surface-treated to form a metal oxide on the surface of the porous electrode material, or be coated with a metal oxide including $RuO_2$, TaO. An electrical energy storage apparatus, such as a supercapacitor or a lithium battery, containing the fine-array porous electrode material can have significantly improved performances as compared with conventional materials.

18 Claims, 11 Drawing Sheets

(51) Int. Cl.
*H01M 4/80* (2006.01)
*H01M 4/66* (2006.01)
*H01M 10/052* (2010.01)
*H01G 11/28* (2013.01)
*H01G 11/50* (2013.01)
*H01M 10/0525* (2010.01)
*H01M 4/02* (2006.01)

ELECTRODE MATERIAL AND ENERGY STORAGE APPARATUS

CROSS-REFERENCE TO RELATED APPLICATIONS

The present application is a continuation of, and claims priority to, PCT/CN2015/076135, filed on Apr. 9, 2015, the disclosure of which is hereby incorporated by reference in its entirety.

BACKGROUND

Electrical energy storage devices such as supercapacitors or lithium batteries are widely used in electric and hybrid electric vehicles, portable electronic devices, and stationary electrical energy storage. The electrodes of an electrical energy storage apparatus are typically constructed to have large surface areas in order to achieve high energy capacity. In supercapacitors, this can be accomplished by spiral-winding long conductive foils separated by thin insulating plastic or paper materials, and/or by applying electrodes made out of or coated with a material having special structures or compositions.

SUMMARY

The present disclosure relates to an electrode material, and specifically to a fine-array porous material for use in electrodes, and also to its application in electrical energy storage devices.

Electrodes of an existing electrical energy storage apparatus, such as a supercapacitor or a battery, may be made of or coated with a porous material, such as activated carbon, to elevate the relative surface areas of the electrodes to further increase the capacity of the electrical energy that is stored therein. Such carbon electrode materials typically have particle sizes ranging from 0.5 µm-100 µm, and have a porosity ranging about 90-95%. Such carbon electrode materials may have a pore size variations of 25 nm-1000 nm.

Disclosed herein includes an electrode material. The electrode material comprises a high surface-area-to-volume ratio fine-array porous material. Such fine-array porous material may take a shape of a membrane and may have a surface area larger than 100 cm$^2$, such as 20 cm×20 cm, may have a pore size of, for example, less than about 1000 µm and preferably less than about 0.1 µm, and may have a porosity in the range of about 40-85%, preferably about 74%. The size of the pores in the fine-array porous material is substantially uniform with a variation of less than about 20% and preferably of less than about 10%. These features allow steady mass transfer among different regions of the electrode material, effectively reducing local resistance heating due to uneven distribution of resistance caused by the non-uniform composition of the electrode material. Additionally, the significantly-larger void space of the fine-array porous electrode material makes it possible to have an even diffusion of electrolytes within the electrode materials, allowing the electrical charges to be stably stored on the surface of the electrodes, a feature unfeasible in a conventional carbon electrode material.

In some embodiments, the fine-array porous material for use in electrodes can include a plurality of grain boundary regions filled with a solid material to increase a mechanical strength of the porous material, wherein the specific surface area is higher than 4100/mm, the size variation is less than about 10%, and the grain boundary regions have a size of about 5 µm–15 cm.

In some embodiments, the fine-array porous material for use in electrodes comprises a metal, such as Ni, Al, Ti, Sn, Mn, and Ru. In some embodiments, the metal fine-array porous material may be further treated to form a metal oxide, such as NiO, $Al_2O_3$, $TiO_2$, $SnO_2$, $MnO_2$, and $MnO_2$, $Mn_2O_3$, RuO, and $RuO_2$ on the surface of the Ni, Al, Ti, Sn, Mn, and Ru fine-array porous material respectively. In some embodiments, the metal fine-array porous material may be coated with a metal oxide. Examples include an Al fine-array porous electrode material coated with $RuO_2$, and a Ti fine-array porous electrode material coated with TaO. In yet some other embodiments, the fine-array porous electrode material may wholly comprise a metal oxide, such as $RuO_2$, $TiO_2$, $MnO_2$, $Mn_2O_3$, and $Fe_2O_3$.

In some embodiments, the fine-array porous material for use in electrodes may further comprise additional smaller-scale electrode materials in the void space of the pores. Examples of these smaller-scale electrode materials include graphite, graphene, mesocarbon microspheres, petroleum coke, carbon fibers, pyrolytic carbon resin, and LiCoO2. This feature can further increase the relative surface areas of the electrodes comprising the fine-array porous electrode materials containing additional smaller-scale electrode materials.

In some embodiments, the fine-array porous material applied in the electrodes may further comprise a layer of grain-shaped dielectric material on the surface of the electrode, which further increases the relative surface areas of the electrodes. The dielectric material can be selected from at least one of $Al_2O_3$, $BaTiO_3$, $SrTiO_3$, $Ba_xSr_{1-x}TiO_3$, PZT, PLZT or $TiO_2$.

In some embodiments, the electrical energy storage apparatus is a supercapacitor wherein the positive and/or negative electrodes comprise a fine-array porous electrode material. The supercapacitors as such can have much higher double-layer capacitance than traditional capacitors due to the extremely large relative surface area of the electrodes in the double-layer capacitors. In some embodiments where a supercapacitor further comprises a metal oxide, such as $MnO_2$, NiO, $RuO_2$, on the fine-array metal porous electrode material, the use of the metal oxide in the electrodes can further greatly increase the faradaic pseudocapacitance of the supercapacitor. These features can result in drastically elevated capacity of the electrical energy stored in the supercapacitors.

In some embodiments, the electrical energy storage apparatus is a supercapacitor comprising metal fine-array porous electrodes and a metal oxide at the surface of the electrodes, such as Ni/NiO, Al/$A_2O_3$ and Ti/$TiO_2$. The supercapacitor as such can have significantly reduced electrical resistance and thus can have greatly improved charge and discharge rates and cycle life. This configuration can decrease the amount of the heat produced due to electrical resistance, and can shorten the distance of the electron transfer into the metal oxide electrodes, causing reduced electrical resistance and reduced energy waste during energy storage. In addition, the electrode material and the capacitor electrode conductor can be integrally formed or connected, thereby reducing issues such as resistance between the electrode material and external electrode lead lines. Having an effective electrical connection between the conductive current collector and the fine-array electrode material, this metal-metal oxide configuration can have a significantly reduced electrical resistance, compared with a conventional supercapacitor that typically has a high electrical resistance due to the non-ideal connection between the current collector and the electrode material, such as activated carbon.

In some embodiments, the electrical energy storage apparatus is a supercapacitor comprising a separator disposed between a anode and a cathode.

In some embodiments, the separator may be an ion exchange membrane/micropore membrane. In some embodiments, a plurality of fine-array porous membranes are employed. For example, a first fine-array porous material is used as a cathode, a second fine-array porous material is used as an anode, a third fine-array porous membrane having different pore sizes can be employed as a separator.

In some other embodiments, the electrolyte itself can act as a cathode of a supercapacitor, and the fine-array porous material can act as the anode. In this configuration, a dedicated separator may not be necessary. Rather, the metal oxide coating can serve as an electrical separator.

In some embodiments, an aqueous electrolyte is used in the supercapacitor. In some other embodiments, a non-aqueous electrolyte can be used in the supercapacitor.

In some embodiments, the electrolyte can act as an electrode. The electrolyte can be liquid, composed of an organic material, or a solid powder disposed in the pores.

In some embodiments, the electrical energy storage apparatus is a high-capacity, long-life power source battery comprising a plurality of supercapacitors, wherein the plurality of supercapacitor comprising a fine-array porous material in the electrodes. The power source battery can be used in, for example, electric cars, and home energy storage.

In some embodiments, the electrical energy storage apparatus is a high-power battery that allows for a high-power output in a short period, wherein the high-power battery comprises a plurality of supercapacitors, the plurality of supercapacitors comprising a fine-array porous material in the electrodes of each of the plurality of supercapacitors. This type of batteries can be used in, for example, a starter.

In some embodiments, the electrical energy storage apparatus is a lithium ion battery. The positive electrode (anode) of the lithium ion battery comprise a metal fine-array porous material, wherein the surface of the metal fine-array porous material has a composition of lithiated ternary transition metal oxides, such as Li—$MnO_2$ and $LiFePO_4$. In some embodiments, the negative electrode (cathode) of the lithium battery also comprises a fine-array porous material, and examples of composition include Cu, Ni and Mn.

DETAILED DESCRIPTION

Figure 1:
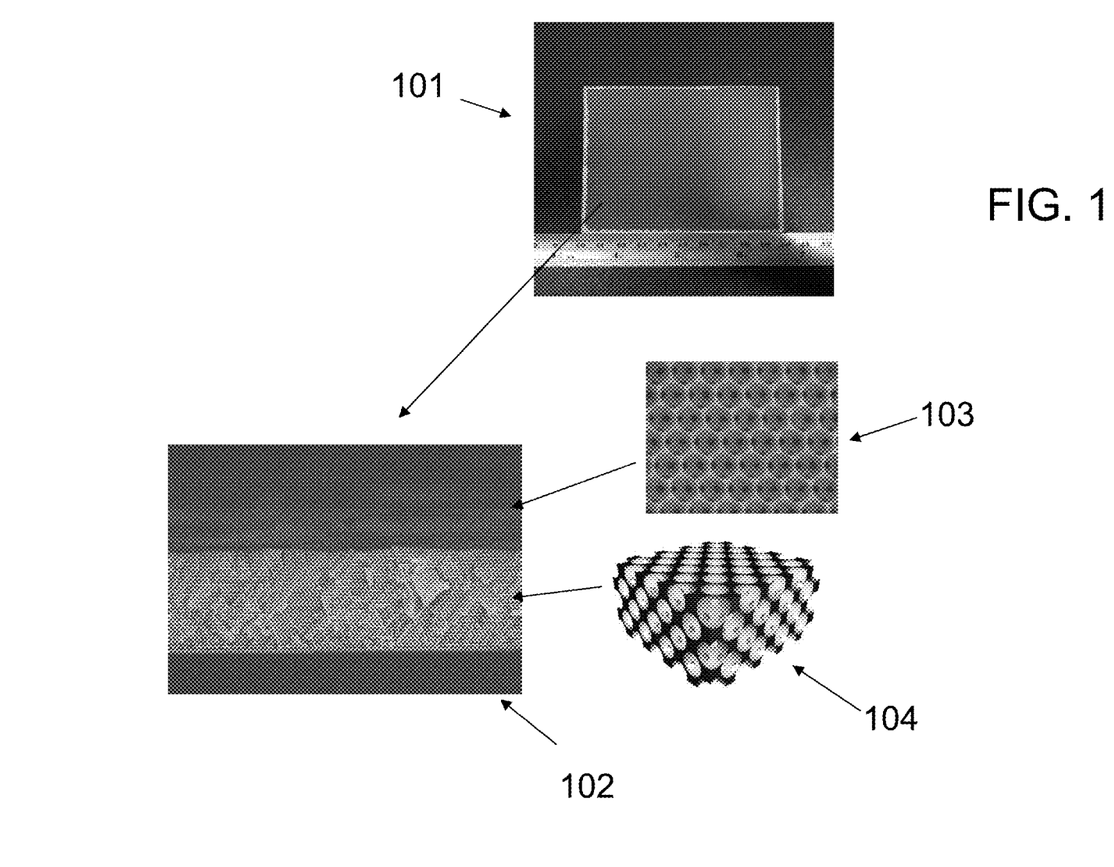
FIG. 1 illustrates a fine-array porous material for use in electrodes in an energy storage apparatus.

FIG. 1 illustrates a high surface-area-to-volume ratio fine-array porous material used in the electrodes of an electrical energy storage apparatus, such as a supercapacitor or a lithium battery. The fine-array porous material can have a shape of a membrane (101), can have a surface area larger than 100 $cm^2$, such as 20 cm×20 cm, and can have a thickness of 25 µm, for example, in its cross sectional view (102). The fine-array porous material contains highly packed fine-array pores, as shown in a 2D view (103) and in a 3D view (104). The pores can have sizes of, for example, less than about 1000 µm, and preferably less than about 0.1 µm, and can have a porosity of 40-85%, preferably about 74%. The size of the pores in the fine-array porous material is substantially uniform with a variation of less than about 20% and preferably of less than about 10%.

Because of the much smaller pore size and porosity, the electrodes of the electrical energy storage apparatus disclosed in FIG. 1 may have an extremely large specific surface area, and thus an extremely large capacity to store electrical energy as well, which is significantly larger than that of the typical electrode materials of existing supercapacitors and lithium batteries. Additionally, the periodic structure of the fine-array porous electrode material (103 and 104) allows the electrolyte to be evenly absorbed and smoothly transported around the electrodes, and because of this feature, the concentration of the electrolyte solution, and internal resistance as well, is steadier and the lifetime and charge/discharge cycles may be extended.

Figure 2:
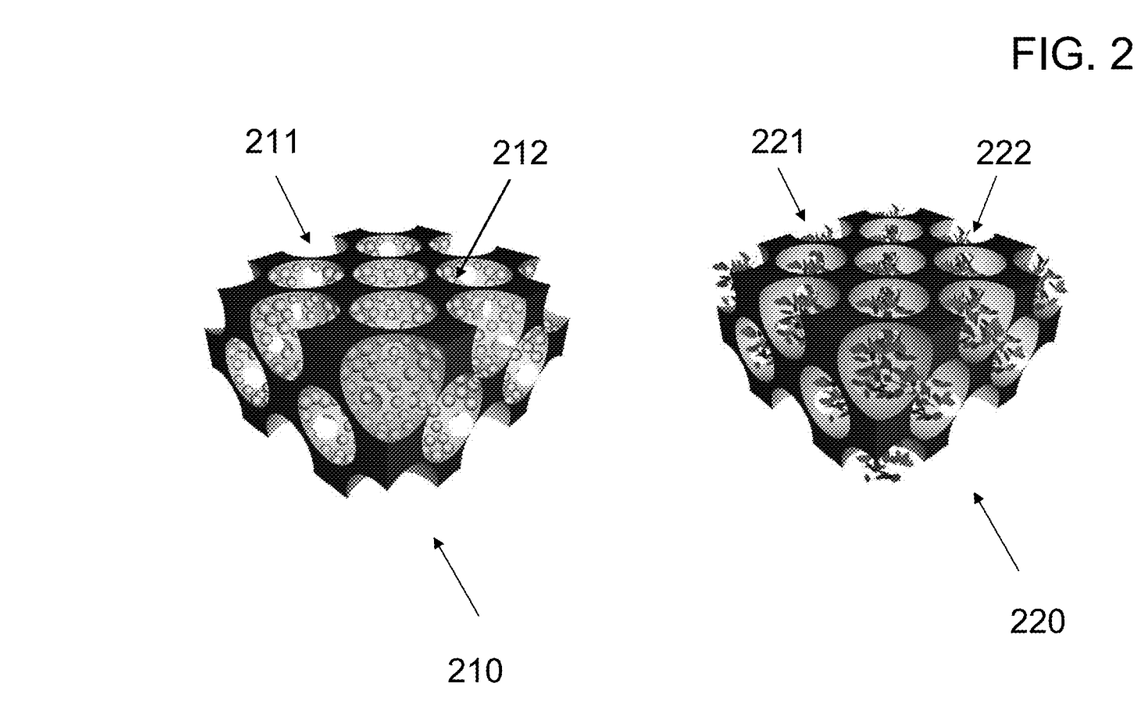
FIG. 2 illustrates fine-array porous electrode materials containing additional smaller-scale electrode materials insides the pores according to some embodiments.

FIG. 2 illustrates fine-array porous electrode materials containing additional smaller-scale electrode materials insides the pores according to some embodiments. In one embodiment, a fine-array porous material (210) has pores (211) containing smaller-scale mesocarbon microspheres (212). In another embodiment, a fine-array porous material (220) has pores (221) containing smaller-scale graphene (222).

Figure 3:
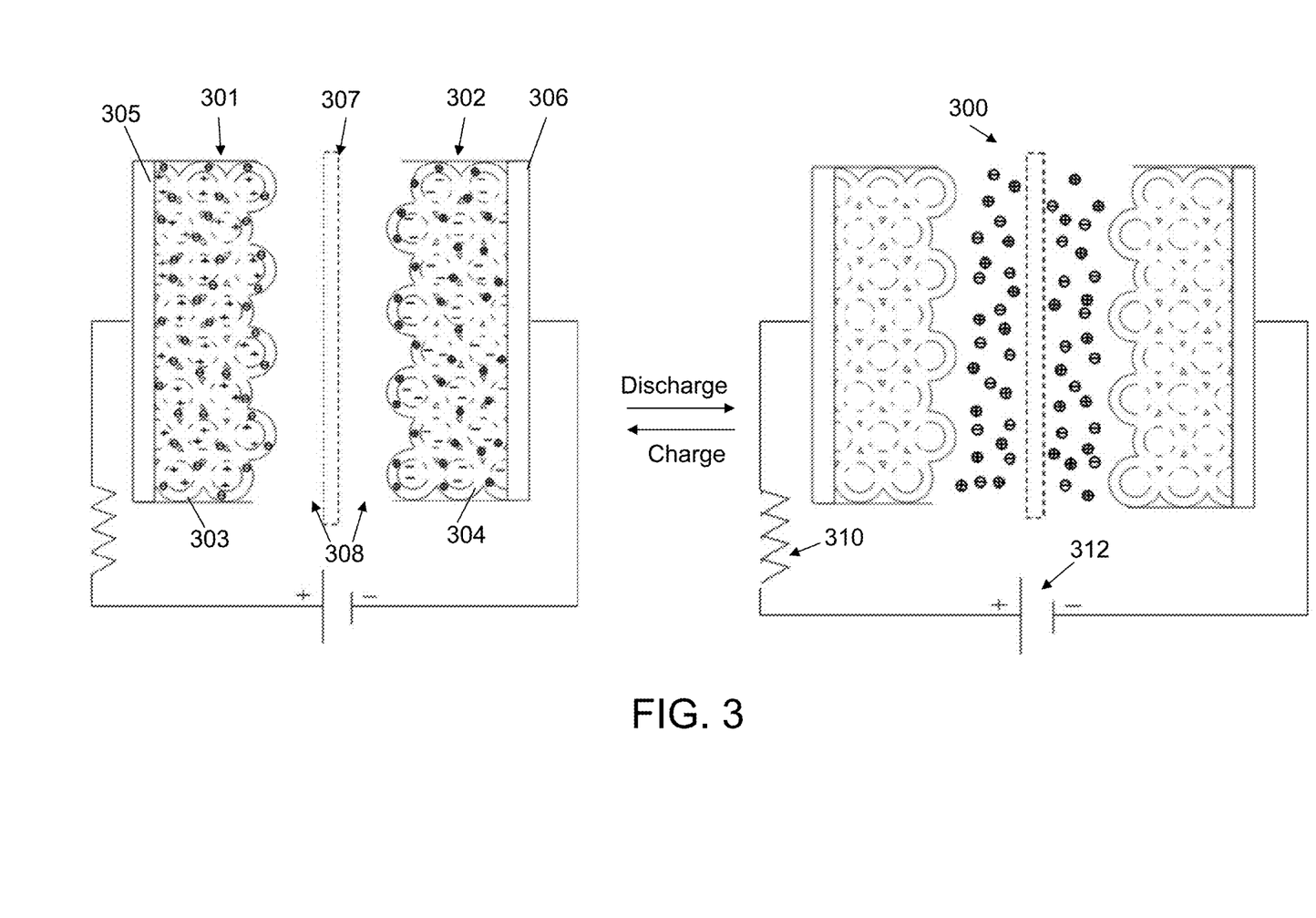
FIG. 3 illustrates a supercapacitor comprising fine-array porous material in its electrodes according to some embodiments.

FIG. 3 illustrates a supercapacitor (300) comprising fine-array porous material in its two electrodes (301 and 302) according to some embodiments. The positive (301) electrode and negative electrode (302) each comprise a fine-array porous material (303 and 304), and a conductive current collector (305 and 306). The supercapacitor (300) may further comprise a separator (307). As discussed above, according to some embodiments, the dedicated separator may not be necessary, but rather can be an oxide as an integral part of the fine-array porous materials. An electrolyte (308) can be disposed in the supercapacitor to make contacts between the current collectors (305 and 306) and the separator (307). The supercapacitor (300) can work with a load resistance (310) and a power source (312).

The supercapacitors comprising fine-array porous materials can have much higher double-layer capacitance than traditional capacitors due to the extremely large specific surface area of the electrodes in the double-layer capacitors contained therein. In some embodiments where a supercapacitor comprises a metal oxide, such as $MnO_2$, NiO, $RuO_2$, in the fine-array porous electrode material, the use of the metal oxide in the electrodes may further greatly increase the faradaic pseudocapacitance of the supercapacitor. These features can both result in drastically elevated capacity of the electrical energy stored in the supercapacitors.

The improvement in the electron storage capabilities can be estimated from the working surface areas based on the specific surface area formula:

$$s_v \approx \frac{281.8}{d}\left[(1-\theta)^{1/2} - (1-\theta)\cdot(1-\theta)^{0.4}\right], \quad (1)$$

where $S_v$ is the specific surface area, d is the average pore diameter in units of mm, $\theta$ is the porous ratio or porosity. For example: for a d=0.01 mm, a porous ratio of 90%, the specific surface area is 2425/mm. For lithium battery carbon electrodes or supercapacitor carbon electrodes, the working porosity can be in the range of 0.9-0.95, for example. For the porous materials disclosed herein (e.g., an inverse opal structure), the porosity can be about 0.74. Correspondingly, the calculated parameters can have the following comparison:

TABLE 1

| Specific surface area | constant | D (mm) | θ | $(1-\theta)^{0.5}$ | $1-\theta$ | $(1-\theta)^{0.4}$ | Sv |
|---|---|---|---|---|---|---|---|
| Carbon Supercapacitor | 281.8 | 0.1 | 0.95 | 0.224 | 0.05 | 0.30 | 147.60 |
| | 281.8 | 0.05 | 0.95 | 0.224 | 0.05 | 0.30 | 295.21 |
| | 281.8 | 0.01 | 0.95 | 0.224 | 0.05 | 0.30 | 1476.03 |
| Fine array porous Supercapacitor | 281.8 | 0.1 | 0.74 | 0.510 | 0.26 | 0.58 | 410.87 |
| | 281.8 | 0.05 | 0.74 | 0.510 | 0.26 | 0.58 | 821.73 |
| | 281.8 | 0.01 | 0.74 | 0.510 | 0.26 | 0.58 | 4108.66 |

As can be seen from the above equation and Table 1, due to the small pore sizes and smaller porosity, the porous materials according to embodiments disclosed herein, when used as electrodes, can have working surface areas substantially larger than carbon electrodes. In some embodiments, the fine-array porous material can increase the specific area to a factor of about 2.8 or larger that of a carbon supercapacitor electrode. In some other embodiments, the specific area can be 100 times larger. When applied to supercapacitor batteries, the exceptional working electrode surface areas also significantly improve performances of the supercapacitors.

The fine-array porous structure can be made of metal conductors, and can be oxidized at the material surface forming metal oxides such as Ni/NiO, Al/Al$_2$O$_3$, Ti/TiO$_2$, Sn/SnO$_2$, Mn/MnO$_2$. Alternatively, the metal conductors can be coated with one or more layers of precious-metal oxides, such as Al/RuO$_2$, Ti/TaO, etc. In some implementations, the fine-array porous structure can be made integrally with RuO$_2$, TiO$_2$, MnO$_2$, etc.

By forming anodes or cathodes of a supercapacitor using the fine-array porous structure disclosed herein, in addition to increasing the specific area thereby significantly increasing the dual-layer capacitor areas, as a result of material selection such as oxides (RuO$_2$, NiO, MnO$_2$, etc.) combined with Faraday capacitance characteristics, the electricity storage capacity of the supercapacitor can be drastically improved.

The materials used for the supercapacitors can be selected from, for example, Ni/NiO, Al/Al$_2$O$_3$, Cu/CuO, Ti/TiO$_2$, RuO$_2$, Mn$_2$O$_3$, MnO, TaO$_2$, etc. A fabrication system can be employed to fabricate the suitable fine array porous materials. The system can include a colloidal particle template formation portion configured to fabricate a colloidal particle template; an infiltration portion configured to infiltrate the colloidal particle template with an infiltrant substance; and a template removal portion configured to remove the colloidal crystal template and keep the infiltrant substance substantially intact. The fabrication process may include the following steps.

Figure 4:
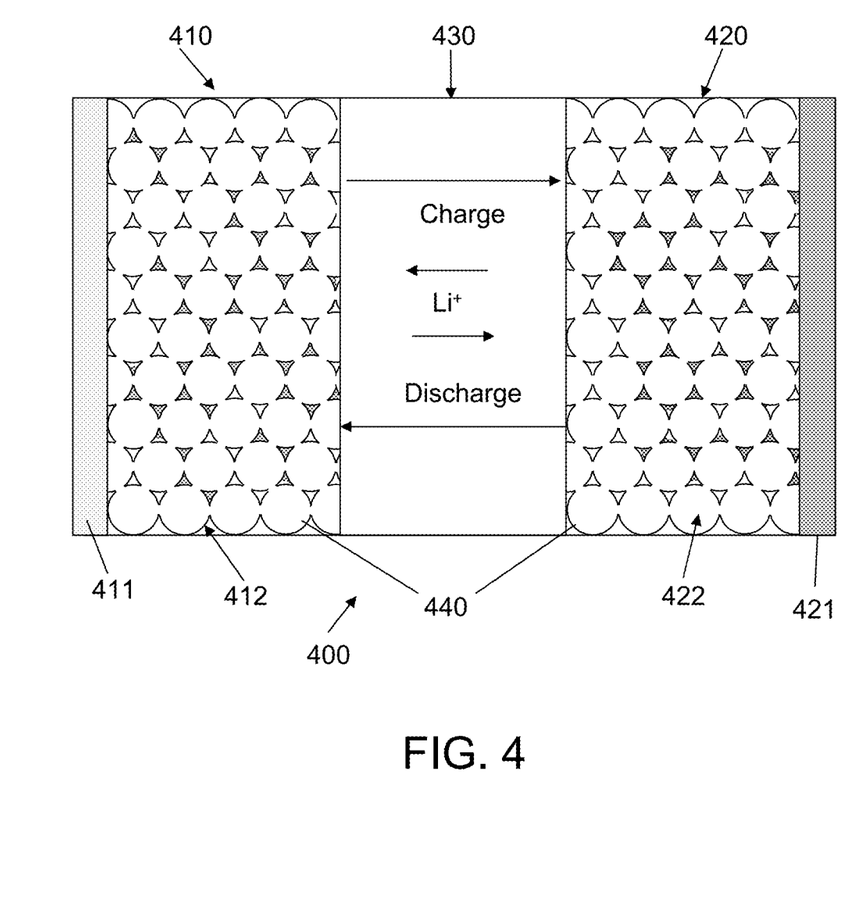
FIG. 4 illustrates a lithium battery comprising fine-array porous material in its electrodes according to some embodiments.

FIG. 4 illustrates a lithium ion battery (400) comprising a fine-array porous material in its electrodes according to some embodiments. The lithium ion battery (400) comprises a cathode (410) and an anode (420), separated by a separator (430) that allows the Li+ ion to move across. The cathode (410) comprises a positive current collector (411) and a fine-array porous cathode material (412). The anode (420) comprises a negative current collector (421) and a fine-array porous anode material (422). An electrolyte (440) containing Li$^+$ is disposed within the lithium battery (400).

In some embodiments, the anode of the lithium ion battery comprises a metal fine-array porous material, wherein the surface of the metal fine-array porous material has a composition of lithiated ternary transition metal oxides, such as Li—MnO$_2$ and LiFePO$_4$. In some embodiments, the cathode of the lithium ion battery also comprises a fine-array porous material, and examples of its composition include Cu, Ni, or Mn.

Figure 5:
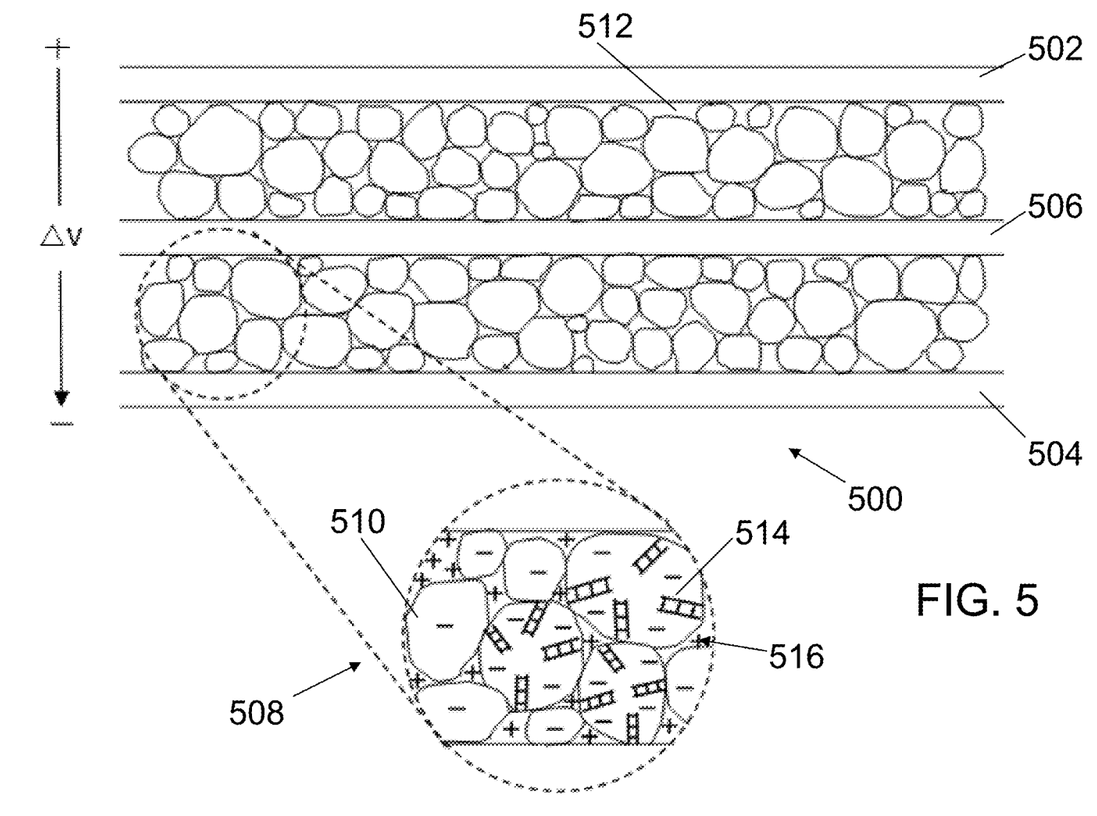
FIG. 5 is a cross-sectional view of a supercapacitor or a battery according to some embodiments.

FIG. 5 is a cross-sectional view of a supercapacitor or a battery (500) according to some embodiments. The structure can include current collectors (502, 504), separator (506), and a porous, high-surface-area material (508) sandwiched therebetween. The material (508) can comprise particles and/or fibers (510). An electrolyte (512) can be disposed between the particles or fibers. The particles or fibers (510) can have a plurality of pores (514) therein. Electrical double-layer structure (516) can be formed around the particles or fibers (510). Energy storage can be realized by charge separation in the double-layer structure (516).

Figure 6:
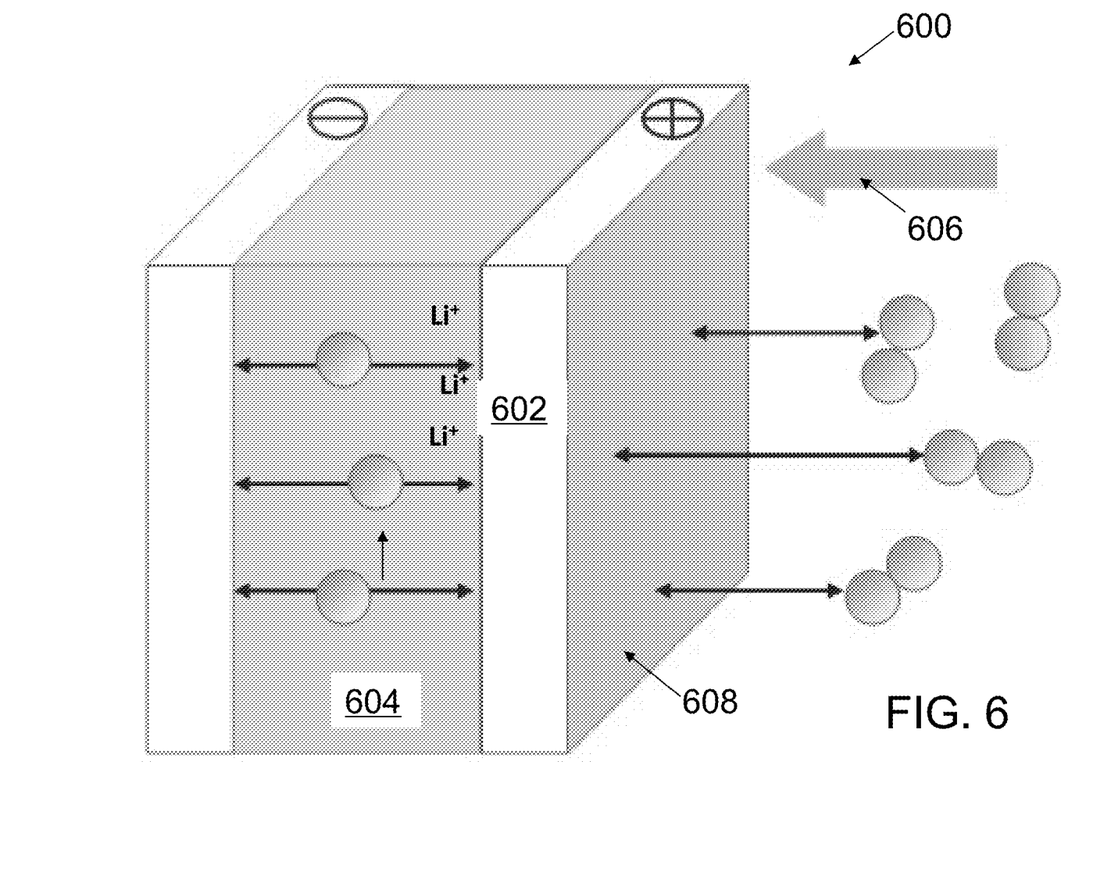
FIG. 6 is a schematic diagram of a lithium battery according to some embodiments.

FIG. 6 is a schematic diagram of a lithium battery (600) according to some embodiments. The battery (600) can comprise an electrode, such as a cathode (602), which may include a fine-array porous material, as well as catalysts for making and breaking Li—O and O—O bonds at specific energies. The battery (600) can also include an electrolyte (604), which according to some embodiments can be a solid electrolyte configured to stabilize the interface between the electrolyte (604) and the cathode (602). The stable electrolyte also provides good ionic conductivity. Compatible interface membranes may be included for separations. Ionic matter (606) can be fed to the battery (600) through a nanoporous carbon material (608) for transport and conductivity.

Figure 7:
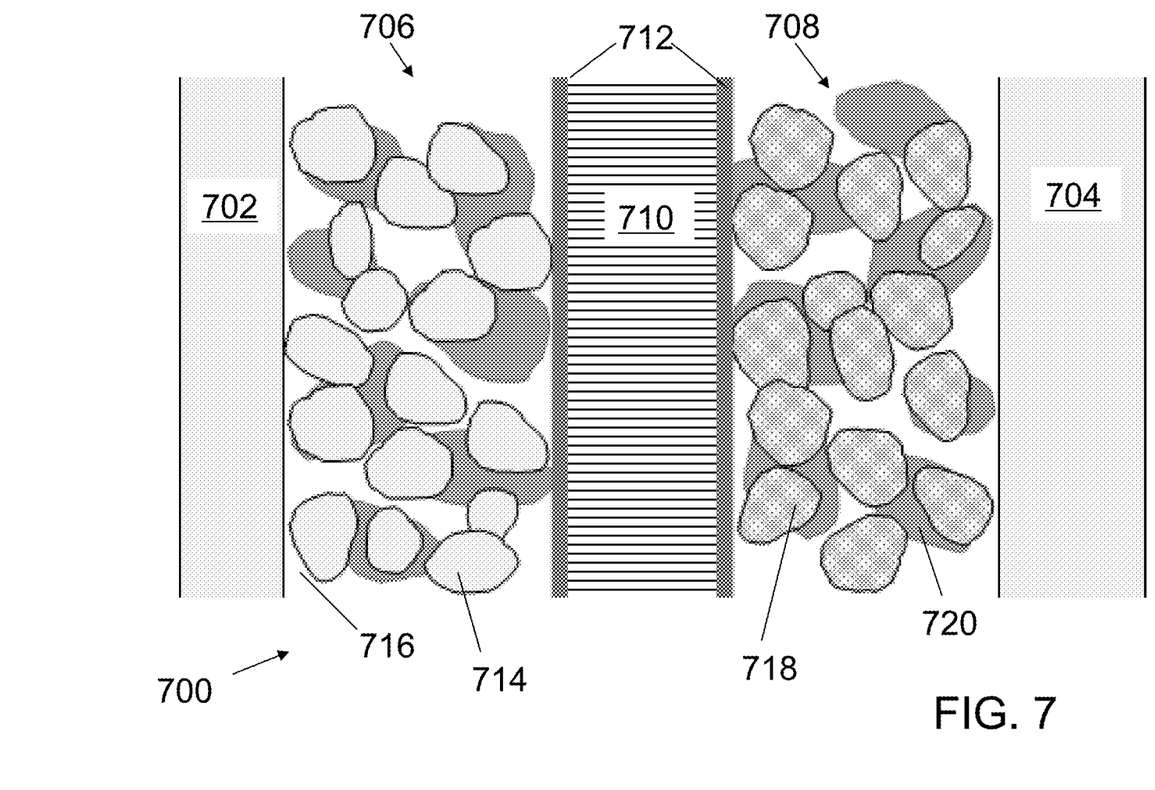
FIG. 7 is a cross-sectional view of a supercapacitor or a battery according to some other embodiments.

FIG. 7 is a cross-sectional view of a supercapacitor or a battery (700) according to some other embodiments. The structure (700) can include current collectors (702, 704), a porous negative electrode (706), a porous positive electrode (708), a separator (710) and its associated interface ceramic layers (712). The porous negative electrode (706) can comprise a graphite material (714) disposed in an electrolyte (716). The porous positive electrode (708) can comprise a metal material (718) bonded together using a polymer binder (720).

In some embodiments, the porous materials used for the electrodes described above can be fabricated using 3D printing technologies. In the 3D printing, parameters such as grain boundaries can be designed into the control program. In some embodiments, the porous materials fabricated by 3D printing contain few or no grain boundaries. Periodic structures can be printed using a 3D printer, including for example FCC, HCP, BCC, SC, DC, or other periodic structures.

In some other embodiments, the porous materials can be fabricated using the methods described below.

Figure 8:
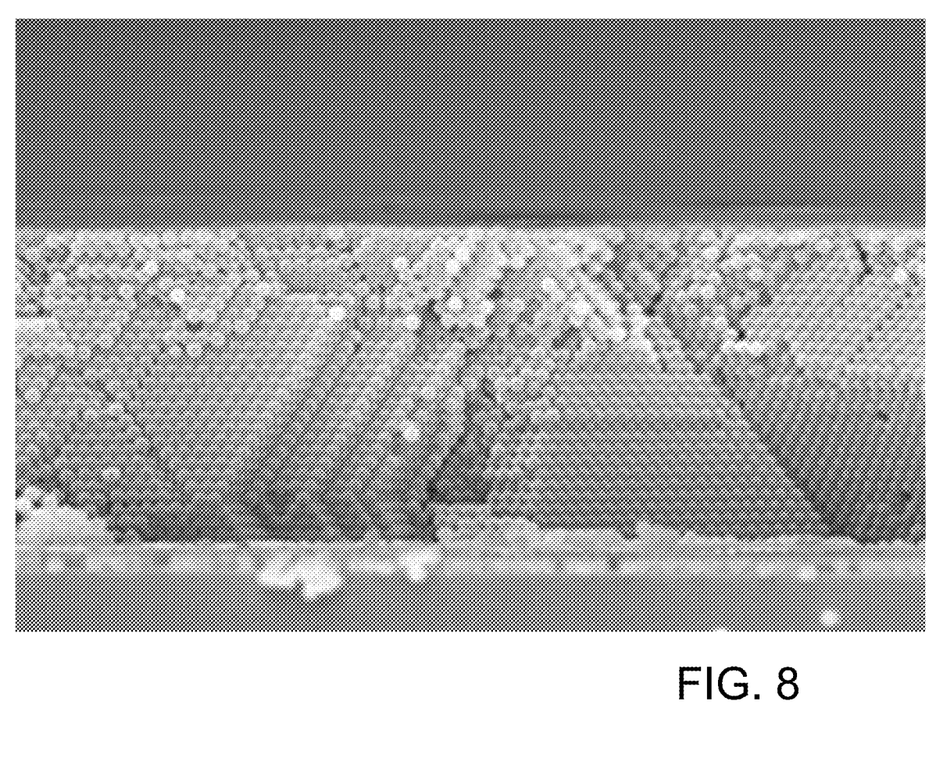
FIG. 8 illustrates a template of tightly-packed colloidal particles used to fabricate a fine-array porous film.

(1) An electrophoresis solution containing a substantially uniform-sized colloidal nanosphere suspension can be disposed in an electrophoresis tank. A working electrode can comprise a movable continuous conductive tape configured to feed into the electrophoresis tank, provide a surface for the formation of a colloidal particle template in the electrophoresis tank, move out of the electrophoresis tank if the electrophoresis self-assembly of the colloidal particle template is complete. The working electrode can be fed with a rate variation, such as 0.1 μm/sec-5 mm/sec, or at a fixed rate or no rate variations (0 μm/sec). In some embodiments, the working electrode can be a solid, such as a metal plate, a silicon wafer, ITO glass, etc. A self-assembled colloidal particle template is shown in FIG. 8.

(2) The colloidal particle template can be transported, for example using the conductive tape or other substrate, through the oven for drying. The drying process can be performed while the template is moving (i.e., dynamic), or while the template is static inside the oven.

(3) The working electrode (e.g., tape) that comes from the electrophoresis portion carrying the dried colloidal particle template can be fed into a deposition tank for plating (such as electroplating, Sol-Gel, CVD, PVD, etc.). Using the fine array of uniformly stacked particles as a template, metal, polymers, ceramic or other materials can be plated over the template filling the space between the particles, forming a fine-array porous film over the colloidal particle template.

Figure 9:
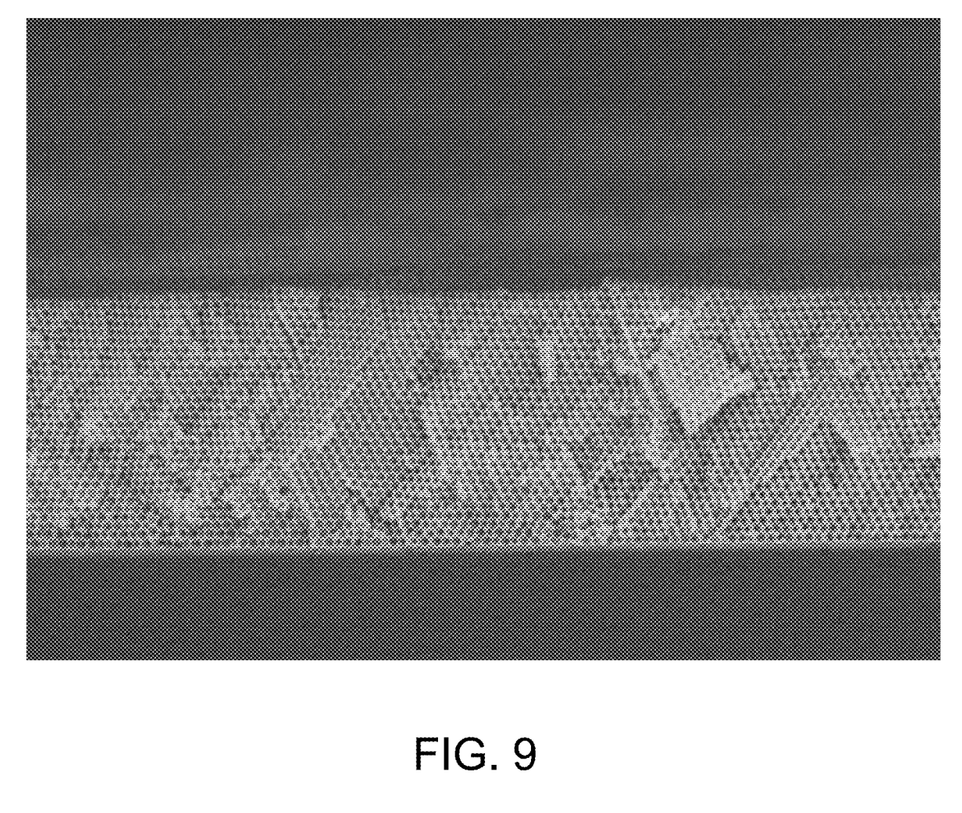
FIG. 9 illustrates a fine-array porous film after removal of the template.

(4) An etching solution can be employed for removal of the colloidal particle template, and the fine-array porous film can therefore be obtained. An example of a fine-array porous film with a high specific surface area is illustrated in FIG. 9.

Figure 10:
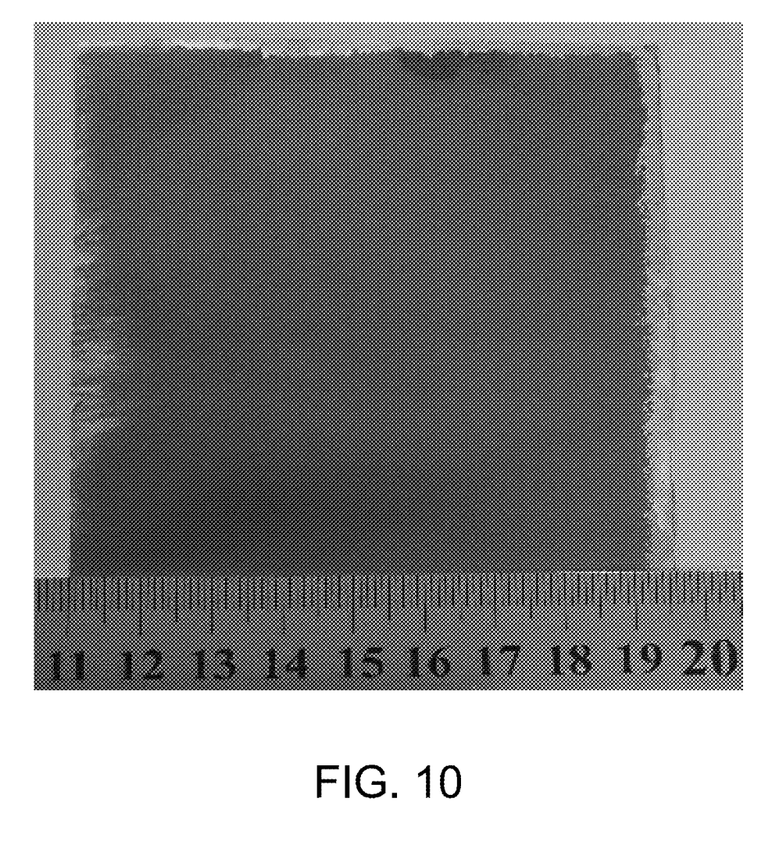
FIG. 10 illustrates a large-area fine-array porous film.
Figure 11:
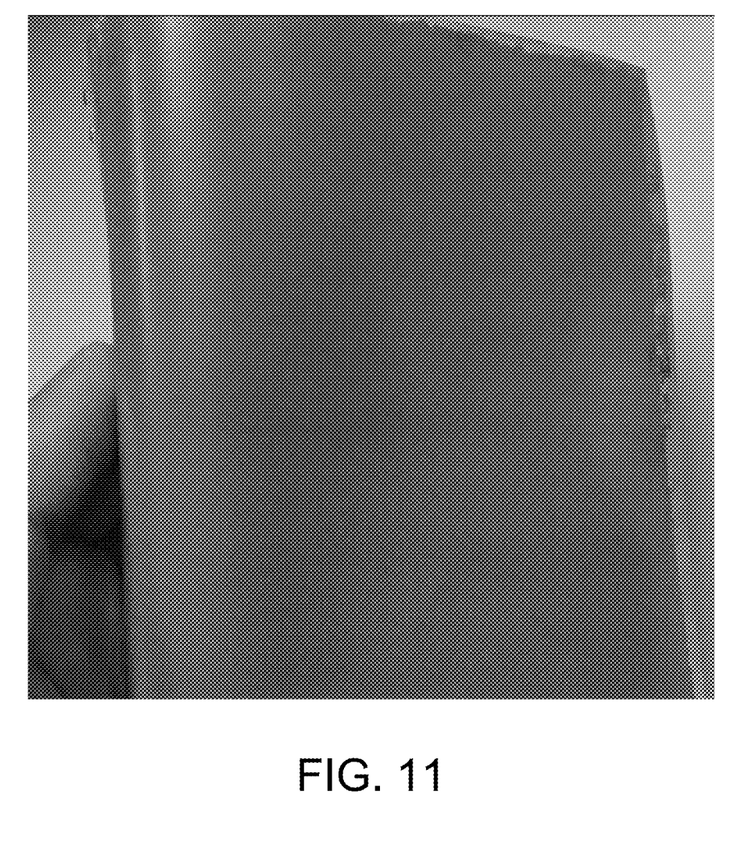
FIG. 11 illustrates a flexible fine-array porous film that can be used as a power source for flexible electronics.

(5) The substrate can be removed from the fine-array porous film comprising tightly stacked pores, and the resulting film can have a large area, as illustrated in FIG. 10. The resulting film can also be flexible, as shown in FIG. 11.

(6) The fine-array porous film can be cut to obtain films or specified shapes and sizes for various applications.

The flexible fine-array porous material can be used as electrodes with unconventional shapes. For example, according to some embodiments, a cylindrical electrode can be provided. According to some embodiments, flexible electrodes, and thereby flexible supercapacitors and batteries can be provided, for example, as part of wearable electronics.

One or more advantages of one or more embodiments disclosed herein may include, for example, reduced electrode resistance, improved electrolyte concentration, and higher utilization of specific areas.

Although specific embodiments have been described above in detail, the description is merely for purposes of illustration. It should be appreciated, therefore, that many aspects described above are not intended as required or essential elements unless explicitly stated otherwise. Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. An electrode material for use in an electrical energy storage apparatus, comprising a fine-array porous material, wherein:
the fine-array porous material comprises a plurality of pores, wherein the plurality of pores have a size of less than about 1000 μm;
the size of the plurality of pores is substantially uniform with a variation of less than about 20%; and
the fine-array porous material has a porosity of about 40-85%;
the fine-array porous material further comprising a plurality of grain boundary regions filled with a solid material to increase a mechanical strength of the fine-array porous material, wherein the grain boundary regions have a size of about 5 μm-15 cm.

2. The electrode material according to claim 1, wherein the electrical energy storage apparatus is a supercapacitor, and the fine-array porous material comprises at least one of Ni, Al, Ti, Sn, Mn, Zr, V, Nb, Ta, W, Cr, Fe, Co, Rh, Ir, Pt, Pd, Cu, Ag, Au, or Ru, and has a specific surface area higher than 4100/mm, and the size variation is less than about 10%.

3. The electrode material according to claim 2, wherein the fine-array porous material further comprises a metal oxide on surface of the fine-array porous material, and the metal oxide is derived from the metal as used in the fine-array porous material.

4. The electrode material according to claim 2, wherein the fine-array porous material further comprises a metal oxide on surface of the fine-array porous material, and the metal oxide comprises at least one of $RuO_2$, $TaO$, $BaTiO_3$, $SrTiO_3$, PZT, $Cu_2O$, ZnO, $Fe_2O_3$, $Co_3O_4$, $SnO_2$, $V_2O_5$, $Ni(OH)_2$, $Co(OH)_2$, or PLZT.

5. The electrode material according to claim 2, wherein the fine-array porous material further comprises a second material within void space of the plurality of pores.

6. The electrode material according to claim 5, wherein the second material comprises at least one of graphene, graphane, mesocarbon microspheres, petroleum coke, carbon fibers, pyrolytic carbon resin, or $LiCoO_2$.

7. The electrode material according to claim 2, further comprising a layer of grain-shaped dielectric material at a surface of the fine-array porous material.

8. The electrode material according to claim 7, wherein the dielectric material comprises at least one of $Al_2O_3$, $BaTiO_3$, $SrTiO_3$, $Ba_xSr_{1-x}TiO_3$, PZT, TaO, $Cu_2O$, ZnO, $Fe_2O_3$, SnO2, Co3O4, V2O5, PLZT, or $TiO_2$.

9. The electrode material according to claim 1, wherein the electrical energy storage apparatus is a supercapacitor, and the fine-array porous material comprises at least one of $RuO_2$, $TiO_2$, $Co_3O_4$, $SnO_2$, $V_2O_5$, or $MnO_2$.

10. The electrode material according to claim 1, wherein the electrical energy storage apparatus is a lithium battery, and wherein the fine-array porous material has a composition of a lithiated ternary transition metal oxide selected from Li—$MnO_2$, $LiFePO_4$, and wherein the fine-array porous material comprises a conductive polymer selected from PPV, PPY, PAC, PANI, PT, PEDOT or PPS, and wherein the conductive polymer comprises large molecules acting as pseudo capacitors.

11. An energy storage apparatus comprising an electrode including a fine-array porous material, wherein:
the fine-array porous material comprises a plurality of pores, wherein the plurality of pores have a size of less than about 1000 μm;
the size of the plurality of pores is substantially uniform with a variation of less than about 20%; and
the fine-array porous material has a porosity of about 40-85%;
the fine-array porous material further comprising a plurality of grain boundary regions filled with a solid material to increase a mechanical strength of the fine-array porous material, wherein the grain boundary regions have a size of about 5 μm-15 cm.

12. The apparatus of claim 11, wherein the fine-array porous material comprises a metal selected from at least one of Ni, Al, Ti, Sn, Zr, V, Nb, Ta, W, Cr, Fe, Co, Rh, Ir, Pt, Pd, Cu, Ag, Au, or Mn.

13. The apparatus of claim 12, wherein the fine-array porous material further comprises a metal oxide on surface of the fine-array porous material.

14. The apparatus of claim 11, wherein the fine-array porous material comprises at least one of $RuO_2$, $TiO_2$, $MnO_2$, $Al_2O_3$, $BaTiO_3$, $SrTiO_3$, $Ba_xSr_{1-x}TiO_3$, TaO, $Cu_2O$, ZnO, $Fe_2O_3$, SnO2, Co3O4, V2O5, PZT, or PLZT.

15. The apparatus of claim 11, wherein the fine-array porous material further comprises graphene within void space of the plurality of pores.

16. The apparatus of claim 11, further comprising an electrolyte, wherein the fine-array porous material further comprises a layer of grain-shaped dielectric material on surface of the fine-array porous material, and wherein the electrolyte acts as another electrode.

17. The apparatus of claim 11, wherein the apparatus comprises a lithium battery having an anode, and wherein the fine-array porous material of the anode has a composition of a lithiated ternary transition metal oxide selected from Li—$MnO_2$, or $LiFePO_4$.

18. The apparatus of claim 17, wherein the fine-array porous material of a cathode has a composition selected from at least one of Ni, Al, Ti, Sn, Zr, V, Nb, Ta, W, Cr, Fe, Co, Rh, Ir, Pt, Pd, Cu, Ag, Au, or Mn.

* * * * *